June 1, 1971     J. L. RODGERS     3,581,323
VENTED ENTRANCE ENCLOSURE FOR BEEHIVES
Filed Dec. 24, 1968
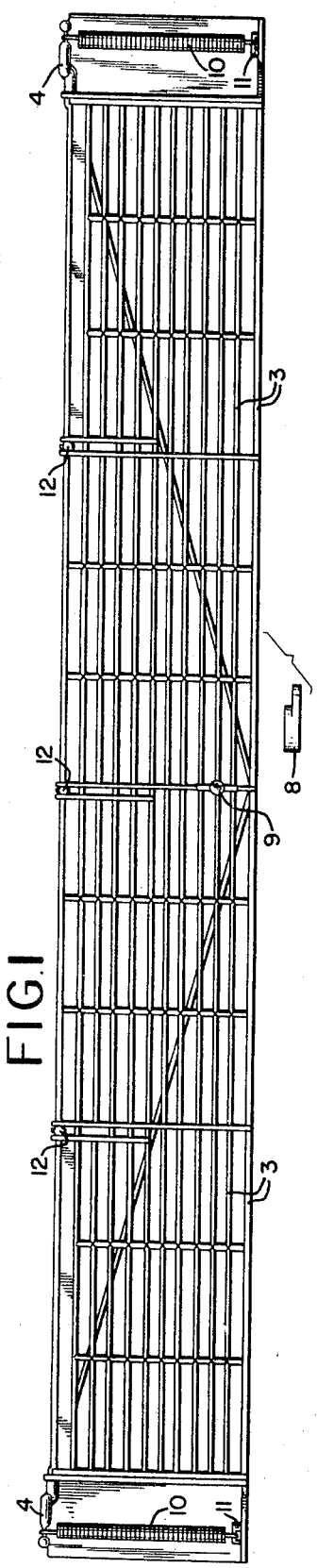
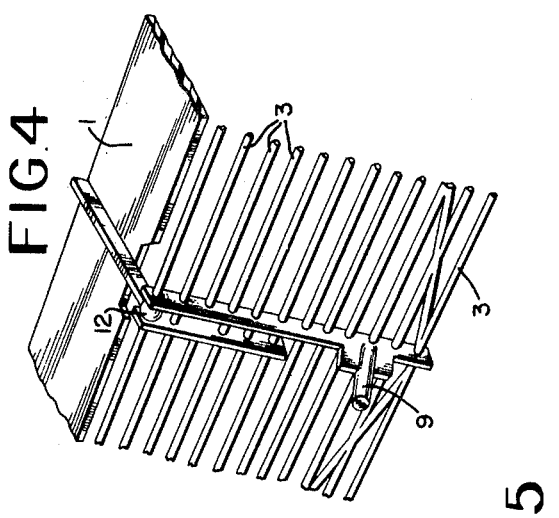
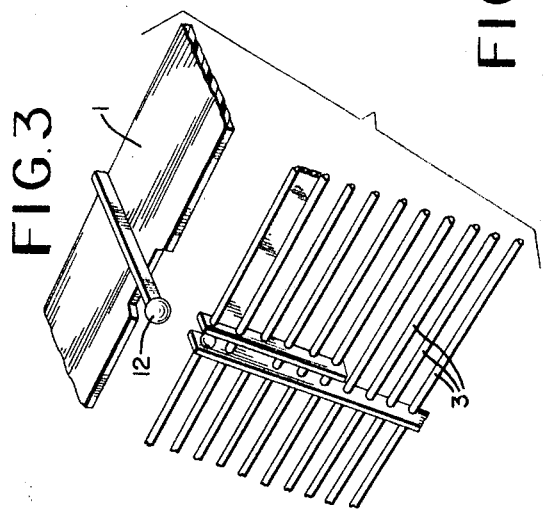
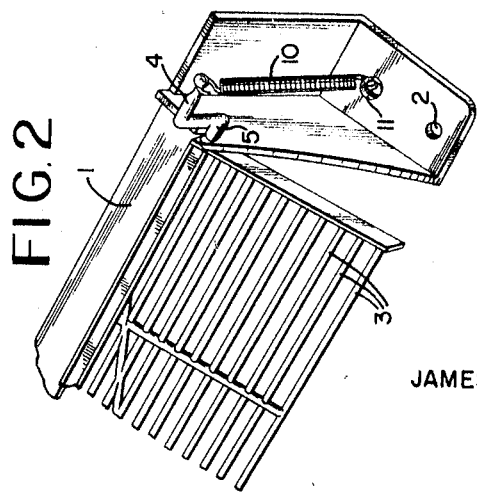
*INVENTOR.*
JAMES LAWRENCE RODGERS

United States Patent Office 3,581,323
Patented June 1, 1971

3,581,323
VENTED ENTRANCE ENCLOSURE FOR BEEHIVES
James Lawrence Rodgers, Augusta County, Va.
(P.O. Box 935, Burgaw, N.C. 28425)
Filed Dec. 24, 1968, Ser. No. 786,687
Int. Cl. A01k 47/06
U.S. Cl. 6—4       5 Claims

ABSTRACT OF THE DISCLOSURE

A vented entrance enclosure is attached to the front of a beehive. It has a plastic vented gate that is pivotally mounted and a control knob regulates the height of the opening under the gate.

In the field of apiarculture, it has been the general practice to employ an entrance reducer to reduce the size of the hive entrance for purposes of the bees and preventing robbing by bees from other hives, and by mice and other small rodents. It has also been the general practice to employ a separate queen and drone trap for purposes of control of queen and drones within the individual hive, such devices have served the limited purposes for which they were designed. However neither of these devices will provide an overall efficient hive control to allow one-step easy management of the individual hive.

The general purpose of this invention is to provide the beekeeper with a single-unit device which will allow him to perform several of the necessary tasks connected with the management of his individual colonies of bees, such as, the prevention of rodents entering the hive during the dormant season; preventing of suffocation of the colony during transit; leak-proof confinement of the entire colony for movement; and queen control of a new swarm. To attain this, the present invention employs a plastic vented gate fitted to a plastic gate hanger which attaches to the hive body at the entrance. Among other things a control knob is also used at the base of the vented gate to regulate the height of the opening under the vented gate and to prevent the accidental closing of the vented gate.

An object of the invention is the prevention of rodents entering the hive during the dormant season.

Another object is to provide a vented area to prevent suffocation of the colony during transit and, at the same time, to assure leak-proof confinement of the entire colony for movement.

A further object of the vented enclosure is to provide queen control of a new swarm.

A further object is to securely and tightly close the entrance of a hive not free from disease in which the bees shall have died at any times; thus, making the hive tight in order that robber bees cannot enter or leave such hive or obtain honey therefrom.

Further advantages of this invention will become apparent from the description to follow. This description makes reference to and must be read in conjunction with the accompanying drawings and illustrations which show the vented enclosure from different angles and illustrate in detail the various unique parts of this enclosure.

In the drawings;

FIG. 1 shows the entire vented enclosure as it would attach to the front of a hive.

FIG. 2 shows an enlarged view of one end of the vented enclosure.

FIGS. 3 and 4 illustrate the ball and socket hinge 12 separated in FIG. 3 and snapfitted together in FIG. 4; FIG. 4 illustrates the finger hold 9 used to open and shut the vented gate 3.

FIG. 5 illustrates the control knob 8 holding the vented gate 3 at one of the various levels.

Referring now to the FIGS. 1–5, a gate hanger 1 is attached to the bottom board of the hive and to the front of the hive body with screws fitted through the molded screw holes 2 in the gate hanger 1.

The vented gate 3 is attached to the gate hanger 1 by means of three ball and socket hinges 12. The ball sockets 7 are molded into the vented gate 3 as shown in FIG. 3 and the balls 6 are molded into the gate hanger 1 as also shown in FIG. 3.

The balls 6 are snapfitted into the sockets 7 as shown in FIG. 4. The vented gate 3 is further connected to the gate hanger 1 at each end by means of a crank 4 molded to the vented gate 3 which is fitted into a loose hinge socket 5 molded into the gate hanger 1 as illustrated in FIG. 2.

The vented gate 3 opens and closes by means of the three ball and socket hinges 12 and is held in any one of several open positions or closed positions by the tension created by two springs 10. Each spring 10 is hooked at one end to the gate crank 4 and at the other end to a spring hanger 11, which is molded into the gate hanger 1.

The various vented gate positions previously referred to are achieved by the use of the control knob 8. This control knob 8 is attached to the hive bottom board by a flat-head wood screw positioned in the counter sunk hole 13 molded into the control knob. Once attached the control knob 8 can be turned to three different positions. In the first position, the vented gate 3 is lowered flush with the hive bottom board and the control knob is turned inward until it contacts the vented gate 3 forcing the vented gate 3 to remain in a closed position. In the second position, the vented gate 3 rests on the first level 14 of the control knob 8 as illustrated in FIG. 5. At this level, the worker bees in the colony are able to enter and exit the hive. However, at the same level it is not feasible for a queen bee to exit the hive nor can any small rodents enter the hive. In the third position, the control knob 8 serves as a safety device. In this position the vented gate 3 is open to its widest position. The control knob 8 is then turned inward so that in the event the vented gate 3 is accidently shut, it will come to rest on the upper level of the control knob 8, thus allowing working bees, drone bees and the queen bee complete entering and exiting freedom.

It should be understood, of course, that the foregoing disclosure relates to only preferred embodiments of the invention and that numerous modifications or alterations may be made therein without departing from the spirt and the scope of the invention. It is desired, therefore, that only such limitations be placed on the invention as are imposed by the art and as set forth in the appended claims.

What is claimed is:

1. A vented entrance enclosure adapted to be attached to the front of the entrance of a beehive including a gate hanger having mounting screw holes therein, a vented gate pivotally attached to said hanger, crank means attached to at least one end of said vented gate, spring means having one end thereof connected to said crank means and the other end secured to said hanger whereby the gate may pivot from a closed position to an open position.

2. A vented entrance enclosure as defined in claim 1 in which there are provided three ball and socket joints by which the gate is removably mounted on the hanger.

3. A vented entrance enclosure as defined in claim 1 in which there are provided two crank means, one at each end of said gate, and loose hinge sockets on said hanger into which said crank means are fitted.

4. A vented entrance enclosure as defined in claim 1 including a pivoted control knob mounted below the gate providing means for regulating or adjusting the width of the vented gate opening.

5. In a vented entrance enclosure such as described in claim 4, the said control knob is rotated to one of the three positions with relation to the said vented gate; in the first position, the vented gate is closed and the said control knob rests flush against the front of the said vented gate, thus, assuring that the said vented gate will remain in the closed position; in the second position, the said control knob is rotated to a position whereby the gate comes to rest on the first step of the control knob; in such a position, the worker bees are allowed complete access to the hive, but the queen is unable to leave; in the third position, the control knob is rotated to a position whereby if the gate does come to rest on the said control knob, it will be at the top level allowing complete freedom of movement by all bees in the colony, thus preventing the accidental closing of the said vented gate.

References Cited

UNITED STATES PATENTS

| 546,007 | 9/1895 | Ferguson | 6—4(.2) |
|---|---|---|---|
| 3,350,728 | 11/1967 | Root | 6—4 |

LUCIE H. LAUDENSLAGER, Primary Examiner